(12) United States Patent
Mitsui

(10) Patent No.: US 11,355,982 B2
(45) Date of Patent: Jun. 7, 2022

(54) STATOR AND ELECTRIC MOTOR HAVING AN INSULATING SHEET ARRANGED BETWEEN COILS

(71) Applicant: Fanuc Corporation, Yamanashi (JP)

(72) Inventor: Hidetoshi Mitsui, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/811,390

(22) Filed: Mar. 6, 2020

(65) Prior Publication Data

US 2020/0295619 A1 Sep. 17, 2020

(30) Foreign Application Priority Data

Mar. 13, 2019 (JP) .............................. JP2019-046259

(51) Int. Cl.
*H02K 3/34* (2006.01)
*H02K 3/52* (2006.01)
*H02K 3/38* (2006.01)

(52) U.S. Cl.
CPC .............. *H02K 3/345* (2013.01); *H02K 3/34* (2013.01); *H02K 3/38* (2013.01); *H02K 3/525* (2013.01); *H02K 3/521* (2013.01)

(58) Field of Classification Search
CPC ............ H02K 3/34; H02K 3/345; H02K 3/38; H02K 3/487; H02K 3/521; H02K 3/525
USPC .................................. 310/179, 214, 216.105
See application file for complete search history.

(56) References Cited

U.S. PATENT DOCUMENTS

| | | | | |
|---|---|---|---|---|
| 3,909,648 A | | 9/1975 | Clark | |
| 4,507,580 A | * | 3/1985 | Obara | H02K 3/38 29/596 |
| 5,093,543 A | * | 3/1992 | Patton | H02K 3/38 174/138 E |
| 5,659,219 A | * | 8/1997 | Momose | H02K 3/38 29/596 |
| 8,659,204 B2 | * | 2/2014 | Shoji | H02K 3/487 310/215 |
| 9,882,445 B2 | * | 1/2018 | Coldwate | H02K 3/38 |
| 2005/0168097 A1 | * | 8/2005 | Takizawa | H02K 3/30 310/215 |
| 2014/0175937 A1 | * | 6/2014 | Coldwate | H02K 3/34 310/215 |

FOREIGN PATENT DOCUMENTS

| | | |
|---|---|---|
| JP | 2000041351 A | 2/2000 |
| JP | 2008172878 A | 7/2008 |
| JP | 2012125104 A | 6/2012 |

(Continued)

*Primary Examiner* — Rashad H Johnson
(74) *Attorney, Agent, or Firm* — RatnerPrestia

(57) ABSTRACT

A stator includes a stator core, a first coil and a second coil inserted into slots, and an insulating sheet arranged between the first and second coils. The first coil has a first portion accommodated in a first slot, and the second coil has a second portion accommodated in the first slot. The insulating sheet includes a sheet-like insulating parts projecting from respective end surfaces of the stator core, and leg parts. Each of the sheet-like insulating parts is arranged between a first coil end of the first coil extending from the first portion to the outside of each of the end surfaces and a second coil end of the second coil extending from the second portion to the outside of each of the end surfaces, and the leg parts include a first leg part inserted into the first slot and arranged between the first and second portions.

8 Claims, 14 Drawing Sheets

(56) References Cited

FOREIGN PATENT DOCUMENTS

| | | |
|---|---|---|
| JP | 2015116086 A | 6/2015 |
| JP | 2018098995 A | 6/2018 |

* cited by examiner

STATOR AND ELECTRIC MOTOR HAVING AN INSULATING SHEET ARRANGED BETWEEN COILS

CROSS-REFERENCE TO RELATED APPLICATIONS

This application is a new U.S. Patent Application that claims benefit of Japanese Patent Application No. 2019-046259, dated Mar. 13, 2019, the disclosure of this application is being incorporated herein by reference in its entirety for all purposes.

BACKGROUND OF THE INVENTION

Field of the Invention

The present invention relates to a stator and an electric motor.

Description of Related Art

Generally, in electric motors, such as three-phase alternating current electric motors, insulating sheets for ensuring insulation between coils of different phases are used. Japanese Unexamined Patent Publication (Kokai) No. 2018-098995 describes a "motor having an interphase insulation sheet mounted thereon, wherein the interphase insulation sheet includes planar insulating portions disposed so as to protrude from each of end surfaces of the stator core, a first leg portion and a second leg portion which integrally connect the planar insulating portions at the end surfaces and which are inserted into the slots, insulating convex portions that protrude toward an inner side in a radial direction of the stator core from the planar insulating portions at the end surfaces, and a third leg portion which integrally connects the insulating convex portions at the end surfaces and which is inserted into the slot."

Japanese Unexamined Patent Publication (Kokai) No. 2015-116086 describes a "first interphase insulating sheet comprising a pair of annular sheet-like first interphase insulating parts, and a plurality of bridges which have predetermined bridge widths and which connect the pair of first interphase insulating parts." Japanese Unexamined Patent Publication (Kokai) No. 2008-172878 describes an "electric motor having interlayer insulation, wherein the interlayer insulation comprises leg parts which connect a first insulating part which insulates a coil end part with a second insulating part which insulates a coil end part on a side opposite the first insulating part, circumferential direction ends of the first insulating part and the second insulating part are mounted so that the ends thereof overlap each other, and the leg parts of the interlayer insulation are inserted into slots located on both ends of a separation of winding of a subsequent layer inserted inside each layer."

SUMMARY OF THE INVENTION

When, for example, three-phase coils are inserted into slots of a stator core separately in a plurality of times in the production process of a three-phase alternating current electric motor, after a certain phase coil is inserted into slots of the stator core of the electric motor, an insulating sheet is disposed adjacent to the coil end of the coil, and thereafter, a different phase coil is inserted into slots adjacent to the insulating sheet on the opposite side of the certain phase coil with respect to the insulating sheet. In this case, there is a risk that the later-inserted coil will displace the prior-inserted insulating sheet.

An aspect of the present disclosure provides a stator comprising a stator core having a plurality of slots, a first coil and a second coil inserted into the plurality of slots by distributed winding, and an insulating sheet arranged between the first coil and the second coil, wherein the first coil has a first portion accommodated in a first slot, the second coil has a second portion accommodated in a second slot, the insulating sheet includes a pair of sheet-like insulating parts which project from a pair of respective end surfaces of the stator core in the axial direction, and a plurality of leg parts which connect the pair of sheet-like insulating parts to each other, each of the pair of sheet-like insulating parts is arranged between a first coil end of the first coil extending from the first portion to the outside of each of the pair of end surfaces and a second coil end of the second coil extending from the second portion to the outside of each of the pair of end surfaces, and the plurality of leg parts include a first leg part which is inserted into the first slot and which is arranged between the first portion and the second portion.

BRIEF DESCRIPTION OF THE DRAWINGS

The object, characteristics, and advantages of the present invention will be elucidated by means of the description of the embodiments below with reference to the attached drawings. In the attached drawings.

DETAILED DESCRIPTION

Figure 1:
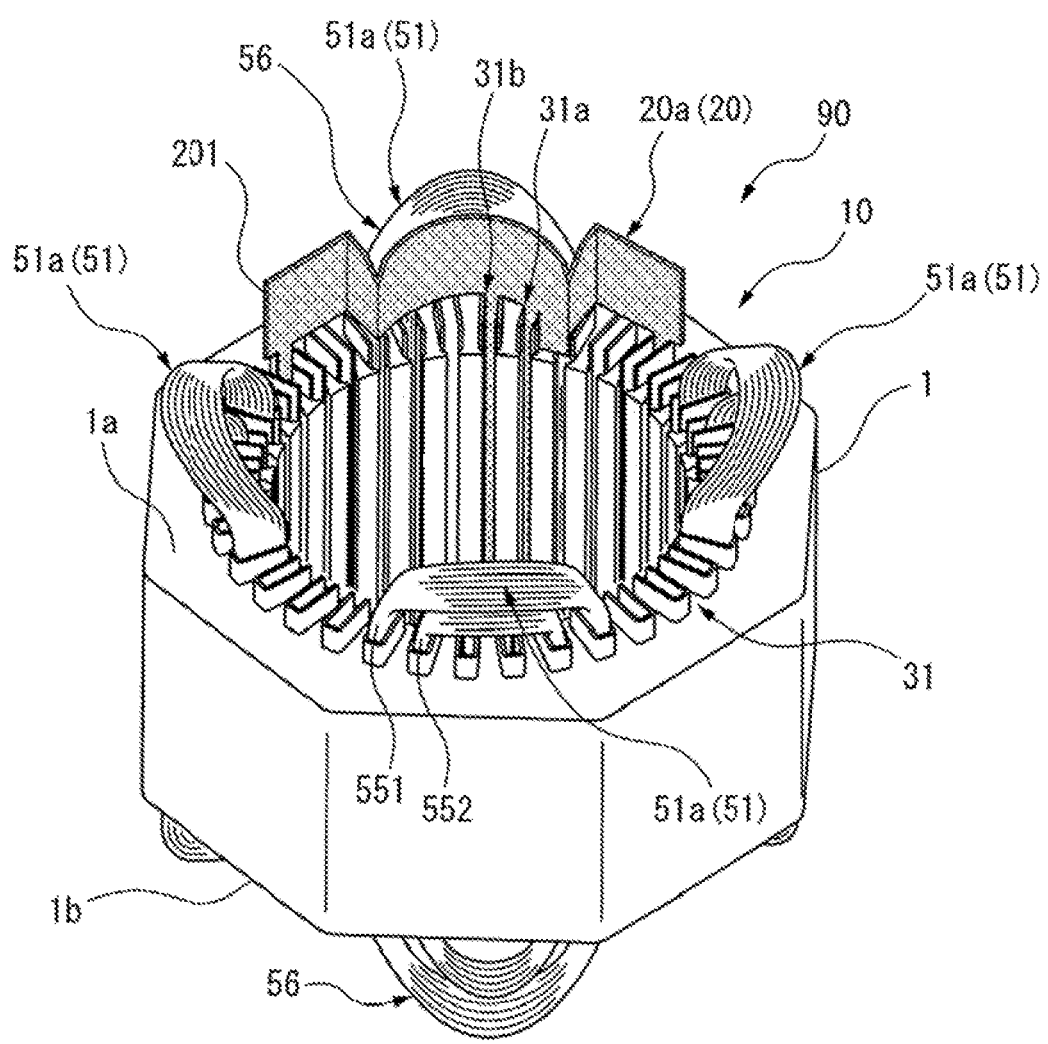
FIG. 1 is a perspective view showing a stator of an electric motor according to a first embodiment.

The embodiments of the present disclosure will be described below with reference to the attached drawings. In the drawings, corresponding constituent elements are assigned common reference signs. In order to facilitate understanding, the scales of the drawings have been appropriately modified. Furthermore, the forms shown in the drawings are merely examples for carrying out the present invention. The present invention is not limited to the illustrated forms.

Figure 2:
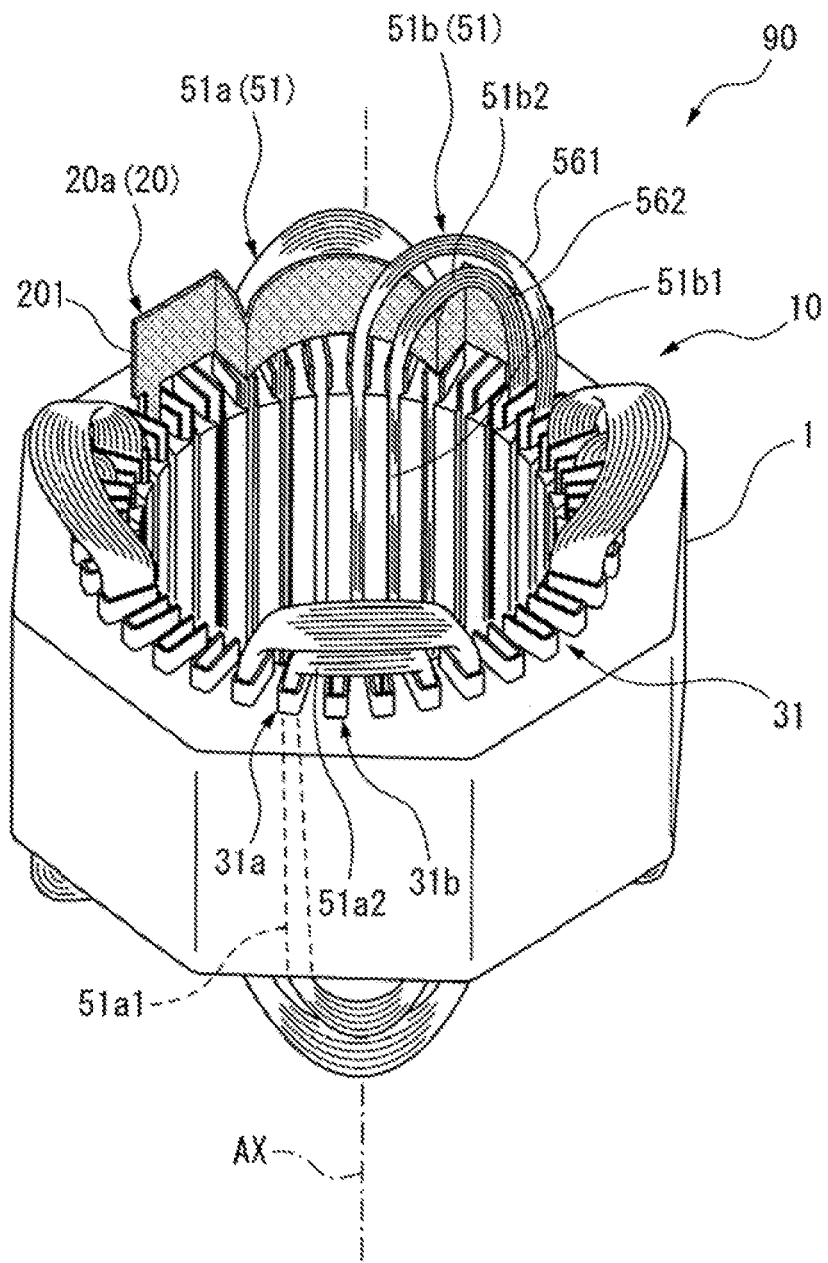
FIG. 2 is a perspective view showing the stator of the electric motor according to the first embodiment.

FIGS. 1 and 2 are perspective views showing a stator 10 of an electric motor 90 according to an embodiment. As shown in FIGS. 1 and 2, the stator 10 includes a stator core 1 having a plurality of slots 31, a plurality of coils 51 including a first coil 51a and a second coil 51b which are inserted into the plurality of slots 31 by distributed winding, and an insulating sheet 20. As an example, the electric motor 90 is a three-phase alternating current electric motor, and the three-phase (U-phase, V-phase, W-phase) coils 51 are inserted into the slots 31 by distributed winding. The U-phase coil will be referred to as the first coil 51a, the V-phase coil will be referred to as the second coil 51b, and the W-phase coil will be referred as a third coil 51c (refer to FIGS. 8A to 8C). The insulating sheet 20 includes an insulating sheet 20a which is arranged between the first coil 51a and the second coil 51b, and an insulating sheet 20b which is arranged between the second coil 51b and the third coil 51c. The stator core 1 is configured as a laminate of electromagnetic steel sheets. The electric motor 90 is constituted by assembling the stator 10 with an unillustrated rotor, bearings, brackets, housing, etc.

For convenience of explanation, in FIG. 1, four W-phase first coils 51a and a single insulating sheet 20a are illustrated, and in FIG. 2, four U-phase first coils 51a, a single insulating sheet 20a, and a single V-phase second coil 51b are illustrated. In practice, in the stator core 1, four first coils 51a are arranged at 90° intervals in the circumferential direction of the stator core 1 (hereinafter referred to simply as the circumferential direction), four second coils 51b are arranged at 90° intervals in the circumferential direction, and four third phase coils 51c are arranged at 90° intervals in the circumferential direction. Furthermore, four insulating sheets 20a are arranged between the four first coils 51a and the four second coils 51b, and four insulating sheets 20b are arranged between the four second coils 51b and the four third coils 51c. A configuration example in which 36 slots 31 are formed in the cylindrical inner circumferential surface of the stator core 1 along the circumferential direction and the coils 51 are inserted into the slots 31 by three-phase distributed wiring is illustrated in FIGS. 1 and 2. However, the present invention is not limited to this configuration example.

The first coil 51a includes a first portion 51a1 which is accommodated in the first slot 31a, which is a slot in which both the first coil 51a and the second coil 51b are inserted. The second coil 51b includes a second portion 51b1 which is accommodated in the first slot 31a. The insulating sheet 20a includes a pair of sheet-like insulating parts 201 and 202 which project, respectively, from a pair of end surfaces 1a, 1b of the stator core 1 in the axial direction, and a plurality of leg parts 211 to 215 which connect the pair of sheet-like insulating parts 201 and 202 to each other (refer to FIG. 3). Each of the pair of sheet-like insulating parts 201 and 202 is arranged between a first coil end 51a2 extending from the first portion 51a1 to the outside of the pair of end surfaces 1a, 1b, and a second coil end 51b2 extending from the second portion 51b1 to the outside of the pair of end surfaces 1a, 1b. The plurality of leg parts 211 to 215 include a first leg part 211 which is inserted into the first slot 31a and which is arranged between the first portion 51a1 and the second portion 51b1.

When the stator 10 is assembled, initially, the first coil 51a is inserted into the slot 31, and thereafter the insulating sheet 20a is mounted on the radially (the radial direction with respect to the center axis AX) inner side of the stator core 1 with respect to the coil ends of the first coil 51a protruding from end surfaces 1a, 1b of the stator core 1 in the axial direction (center axis AX direction). Next, the second coil 51b is inserted into the slot 31, and thereafter the insulating sheet 20b is mounted on the radially inner side of the stator core 1 with respect to the coil ends of the second coil 51b protruding from the end surfaces 1a, 1b of the stator core 1 in the axial direction. Next, the third coil 51c is inserted into the slot 31. As an example, the coils 51 can be mounted in the slot 31 by mounting the coils to be inserted simultaneously on inserter blades of an inserter device and inserting each coil from the end surface 1a side to the end surface 1b side.

As shown in FIG. 1, the first coil 51a is formed of a five-slot pitch large coil 551 and a three-slot pitch small coil 552 arranged inside the large coil 551 in the circumferential direction. The large coil 551 is constituted by winding a winding material having the quantity corresponding to a single slot, and the small coil 552 is constituted by winding a winding material having the quantity corresponding to half of a slot (refer to FIGS. 8A to 8C, which are described later). In other words, the first coil 51a is constituted by winding a winding material having the quantity corresponding to 1.5 slots. The second coil 51b likewise includes a five-slot pitch large coil 561 and a small coil 562 arranged inside the large coil 561 in the circumferential direction (refer to FIGS. 8A to 8C, which are described later). The large coil 561 is constituted by winding a winding material having the quantity corresponding to a single slot, and the small coil 562 is constituted by winding a winding material having the quantity corresponding to half of a slot (refer to FIGS. 8A to 8C, which are described later). In other words, the second coil 51b is constituted by winding a winding material having the quantity corresponding to 1.5 slots. The third coil 51c has a structure identical to those of the first coil 51a and the second coil 51b.

FIG. 2 is a view showing a state in which a single second coil 51b is mounted, on the radially inner side of the stator core 1 with respect to the first coil 51a, so as to interpose the insulating sheet 20a between the second coil 51b and the first coil 51a. As shown in FIGS. 1 and 2, the first coil 51a and the second coil 51b are arranged so as to overlap each other in the range of three slots from the right end slot among the six slots lying within the width of the first coil 51a in the circumferential direction of the stator core 1.

Figure 3:
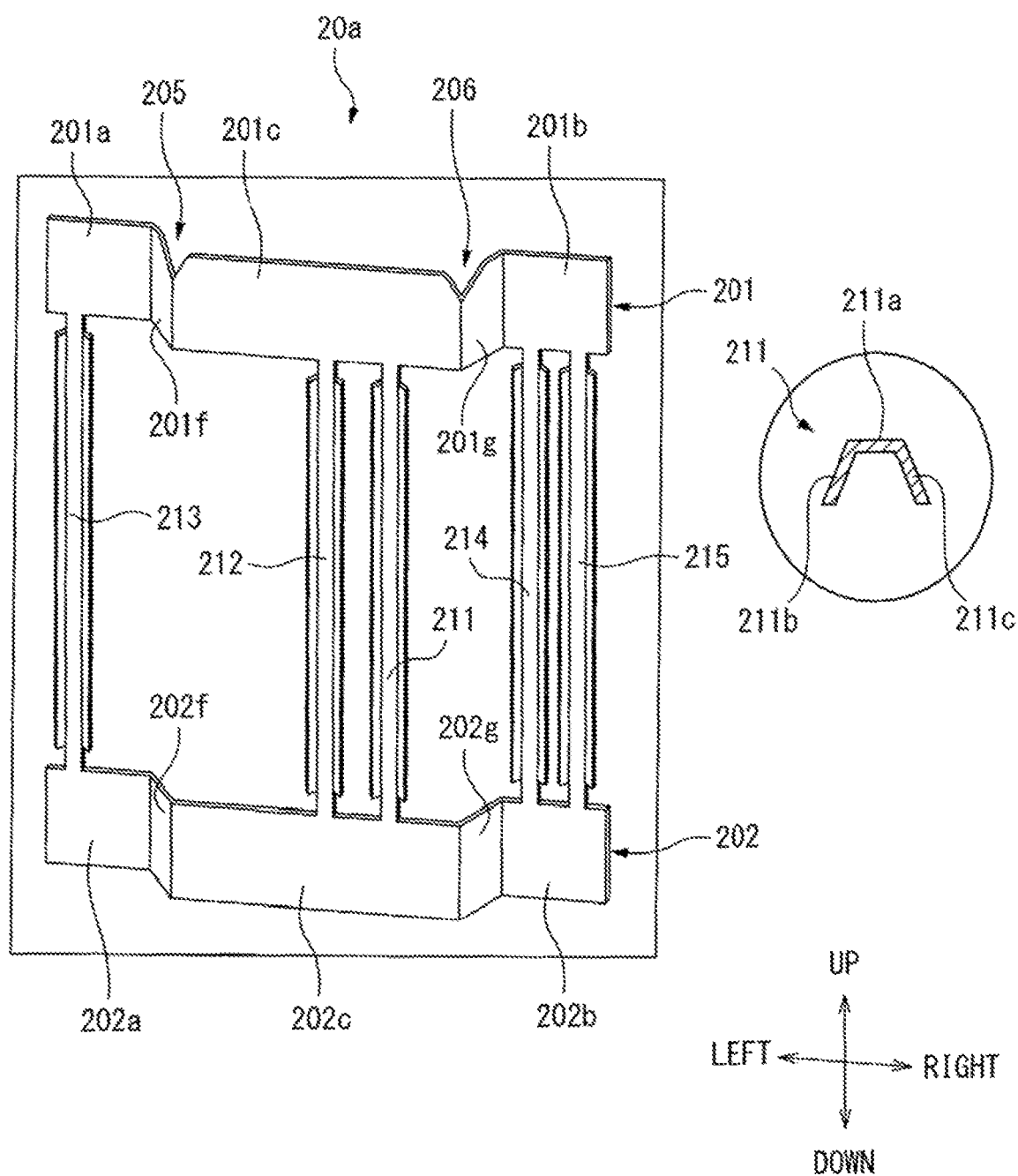
FIG. 3 is a perspective view of an insulating sheet arranged between a first coil and a second coil.

The insulating sheet 20 is produced from a material which is excellent in electrical insulation (e.g., a plastic material). The insulating sheet 20 can be produced by cutting out a blank material by means of punching from a single sheet (film), and thereafter bending the obtained blank sheet by means of a pressing process. FIG. 3 is a perspective view of the insulating sheet 20a. It should be noted that for convenience of explanation, in FIG. 3, the direction corresponding to the axial direction is defined as the upward and downward directions, and the left and right directions are defined as illustrated in the drawing. As shown in FIG. 3, the insulating sheet 20a includes a sheet-like insulating part 201 arranged so as to protrude from the end surface 1a (refer to FIG. 1) of the stator core 1, and a sheet-like insulating part 202 arranged so as to protrude from the other end surface 1b (refer to FIG. 1) of the stator core 1. The insulating sheet 20a further includes a plurality of leg parts 211 to 215 which extend in the axial direction of the stator core 1 so as to connect the sheet-like insulating part 201 and the sheet-like insulating part 202.

The sheet-like insulating part 201 includes a convex main portion 201c which is connected with the first leg part 211 and which is interposed between the first coil end 51a2 and the second coil end 51b2, and sub-portions 201a, 201b which extend from the main portion 201c. The sub-portion 201b is spaced from the first coil end 51a2 and is arranged radially outer side of the stator core 1 with respect to the second coil end 51b2. The main portion 201c covers the radially inner side of the coil end of the first coil 51a, which protrudes from the end surface 1a of the stator core 1. Likewise, the sheet-like insulating part 202 includes a convex main portion 202c which is connected to the first leg part 211 and which is interposed between the first coil end 51a2 and the second coil end 51b2, and sub-portions 202a, 202b which extend from the main portion 202c. The sub-portion 202b is spaced from the first coil end 51a2 and is arranged radially outer side of the stator core 1 with respect to the second coil end 51b2. The main portion 202c covers the radially inner side of the coil end of the first coil 51a, which protrudes from the end surface 1b of the stator core 1.

The main portion 201c and the main portion 202c are connected by the two leg parts 211 and 212. The two leg parts 211 and 212, as shown in FIG. 2, are arranged within the range in which the first coil 51a and the second coil 51b overlap with each other on the main portions 201c, 202c. Specifically, the second leg part 212 is accommodated in the slob 31b (hereinafter also referred to as the second slot 31b) in which the first coil 51a is not accommodated and in which the second coil 51b is accommodated. The second leg part 212 is arranged between the second coil 51b and the inner surface of the second slot 31b. The first leg part 211 is accommodated in the first slot 31a as described above. It should be noted that the leg part 215, like the second leg part 212, is accommodated in the slot 31 in which the first coil 51a is not accommodated and in which the second coil 51b is accommodated. By providing the plurality of leg parts within the range, in which the first coil 51a and the second coil 51b overlap with each other, of the main portion 201c (202c) of the insulating sheet 20a, when the second coil 51b is inserted, from the upper side, into the slot 31 from the state shown in FIG. 1, particularly the lower sheet-like insulating part 202 of the insulating sheet 20a is not pulled by the second coil 51b, whereby it is possible to prevent distortion or displacement of the insulating sheet 20a. In the present embodiment, since the first leg part 211 is arranged in the portions of the sheet-like insulating parts 201, 202 corresponding to the position of the first slot 31a where the pulling force is likely to be strong when the second coil 51b is inserted from the upper side, it is possible to more reliably prevent the insulating sheet 20a from being distorted, displaced or entangled. Furthermore, arrangement of the first leg part 211 in the slot 31a in which both the first coil 51a and the second coil 51b are inserted contributes to an increase in the insulation between the first coil 51a and the second coil 51b.

Figure 4:
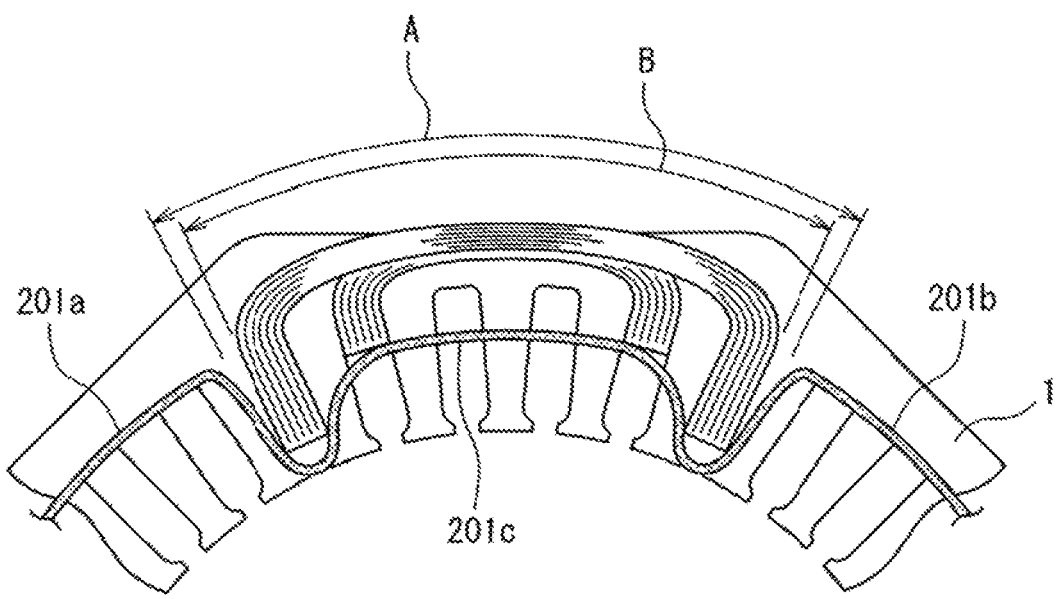
FIG. 4 is a top view of a portion in which the first coil is arranged on an end face of a stator core.

FIG. 4 shows, as a view from the upper side, a portion where the first coil 51a is arranged on the end surface 1a side of the stator core 1. As shown in FIG. 4, the width A of the main portion 201c (202c) of the insulating sheet 20a in the circumferential direction is greater than the width B of the coil end of the first coil 51a. Referring back to FIG. 3, the left end part of the main portion 201c and the right end part of the sub-portion 201a are connected via a connection surface 201f. The right end part of the main portion 201c and the left end part of the sub-portion 201b are connected via a connection surface 201g. The left end part of the main portion 202c and the right end part of the sub-portion 202a are connected via a connection surface 202f. The right end part of the main portion 202c and the left end part of the sub-portion 202b are connected via a connection surface 202g.

The pointed top end part of the bent part of the boundary of the main portion 201c and the connection surface 201f is cut away to form a notched part 205. Likewise, the pointed upper part of the bent part of the boundary of the main portion 201c and the connection surface 201g is cut away to form a notched part 206. By providing the sheet-like insulating part 201 with the notched parts 205, 206 in this manner, when the second coil 51b is inserted into the slot 31 downward from above in FIG. 1, it is possible to prevent occurrence of a situation in which the second coil 51b becomes caught on the pointed tip of the bent part, whereby the insulating sheet 20a is entangled.

Each of the plurality of leg parts 211 to 215 has a shape which maintains the position thereof by means of an elastic restorative force in a deformed state in contact with an inner surface of the slot 31. For example, as shown in the portion surrounded by a circle on the right side of FIG. 3, each of the leg parts 211 to 215 has a downwardly open trapezoidal cross-sectional shape when viewed along the upward and downward directions. Since the leg parts 211 to 215 have identical structures, below, the first leg part 211 will be representatively described. The first leg part 211 includes a main leg surface 211a which is substantially parallel to the main portion 201c, and a left side surface 211b and a right side surface 211c which project diagonally from the left and right edges of the main leg surface 211a toward the radially inner side of the stator core 1. The interval between the left side surface 211b and the right side surface 211c increases from the main leg surface 211a toward the center axis AX.

As shown in FIG. 3, in each of the leg parts 211 to 215, the portion having the main leg surface 211a, the left side surface 211b, and the right side surface 211c is formed excluding the connection portions between the leg parts 211 to 215 and the sheet-like insulating part 201 and the connection portions between the leg parts 211 to 215 and the sheet-like insulating part 202.

Figure 5:
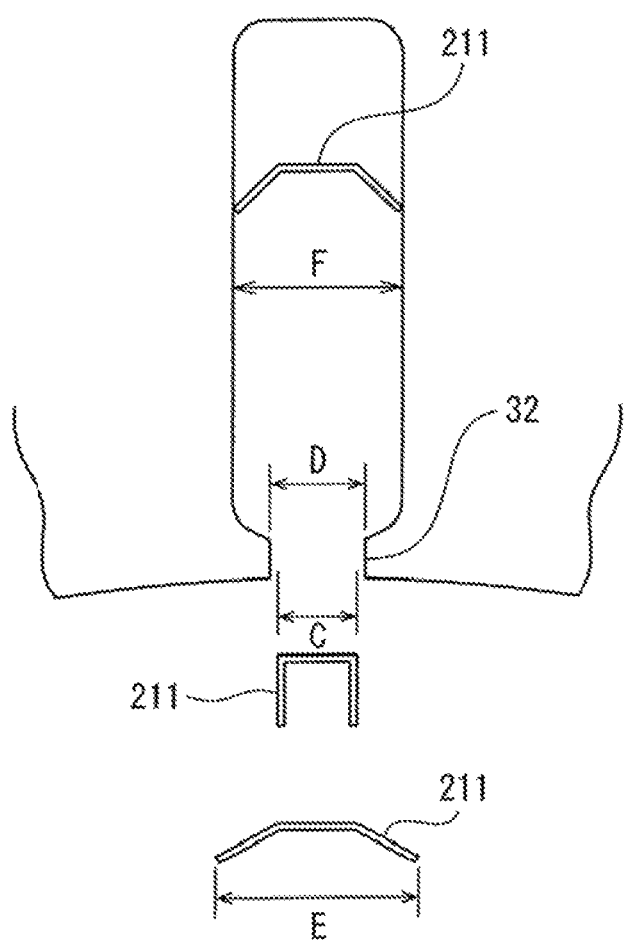
FIG. 5 is a cross-sectional view of a slot taken along a plane perpendicular to the axial direction.

FIG. 5 is a cross-sectional view of one slot of the stator core 1 taken along a plane perpendicular to the center axis AX, which is a view detailing the relationship between the widths of the first leg part 211 and the slot 31. The width of the main leg surface 211a of the first leg part 211, i.e., the width C along the circumferential direction of the stator core 1, is sized so as to pass through the width D of an opening 32 at an inner end of the slot 31 in the radial direction of the stator core 1 (D≥C). Thus, by bending the left side surface 211b and the right side surface 211c by at least 90° with respect to the main leg surface 211a, the first leg part 211 can be pushed into the back side in the slot 31 through the opening 32 of the slot 31.

When the left side surface 211b and the right side surface 211c of the first leg part 211 pass through the opening 32 of the slot 31, an elastic restorative force is exerted thereon, whereby the first leg part 211 returns to the shape in which the interval between the left side surface 211b and the right side surface 211c gets wider at a point farther from the main leg surface 211a. The full width (maximum width) E between the left side surface 211b and the right side surface 211c in the natural state of the first leg part 211 is sized so as to be larger than the width F of the internal space of the slot 31 along the circumferential direction of the stator core 1, i.e., is larger than the gap of the inner surface of the slot 31 in the circumferential direction (E>F). The slot 31 has the constant width F along the radial direction of the stator core 1, excluding the width D of the opening 32. According to the structure described above, the first leg part 211 maintains its' position due to the elastic restorative force in a state in which the first leg part 211 abuts with and is deformed by the inner surface of the slot 31.

Next, the method for installing the insulating sheet 20a will be described. As shown in FIG. 1, the first coil 51a is inserted into and arranged in a predetermined slot 31 of the stator core 1. As a result, the coil ends 56 of the first coil 51a are formed so as to protrude from the end surfaces 1a, 1b of the stator core 1. Next, the insulating sheet 20a is installed on the stator core 1 from the radially inner side. In detail, installation is performed in the following manner. The insulating sheet 20a is installed on the stator core 1 so that the sheet-like insulating part 201 covers the coil end 56 on the end surface 1a side from the radially inner side of the stator core 1, and the sheet-like insulating part 202 covers the coil end 56 on the end surface 1b side from the radially inner side of the stator core 1. At this time, the first leg part 211 is inserted into the first slot 31a, and the second leg part 212 is inserted into the second slot 31b. The leg part 213 is inserted into the slot 31 on the outer side (left side in FIG. 1) of one end of the first coil 51a in the circumferential direction. The leg parts 214 and 215 are inserted into the two slots 31 on the outer side (the right side in FIG. 1) of the other end of the first coil 51a in the circumferential direction. At this time, each of the leg parts 211 to 215 is inserted and pressed into the slot 31 to the back side.

Figure 10:
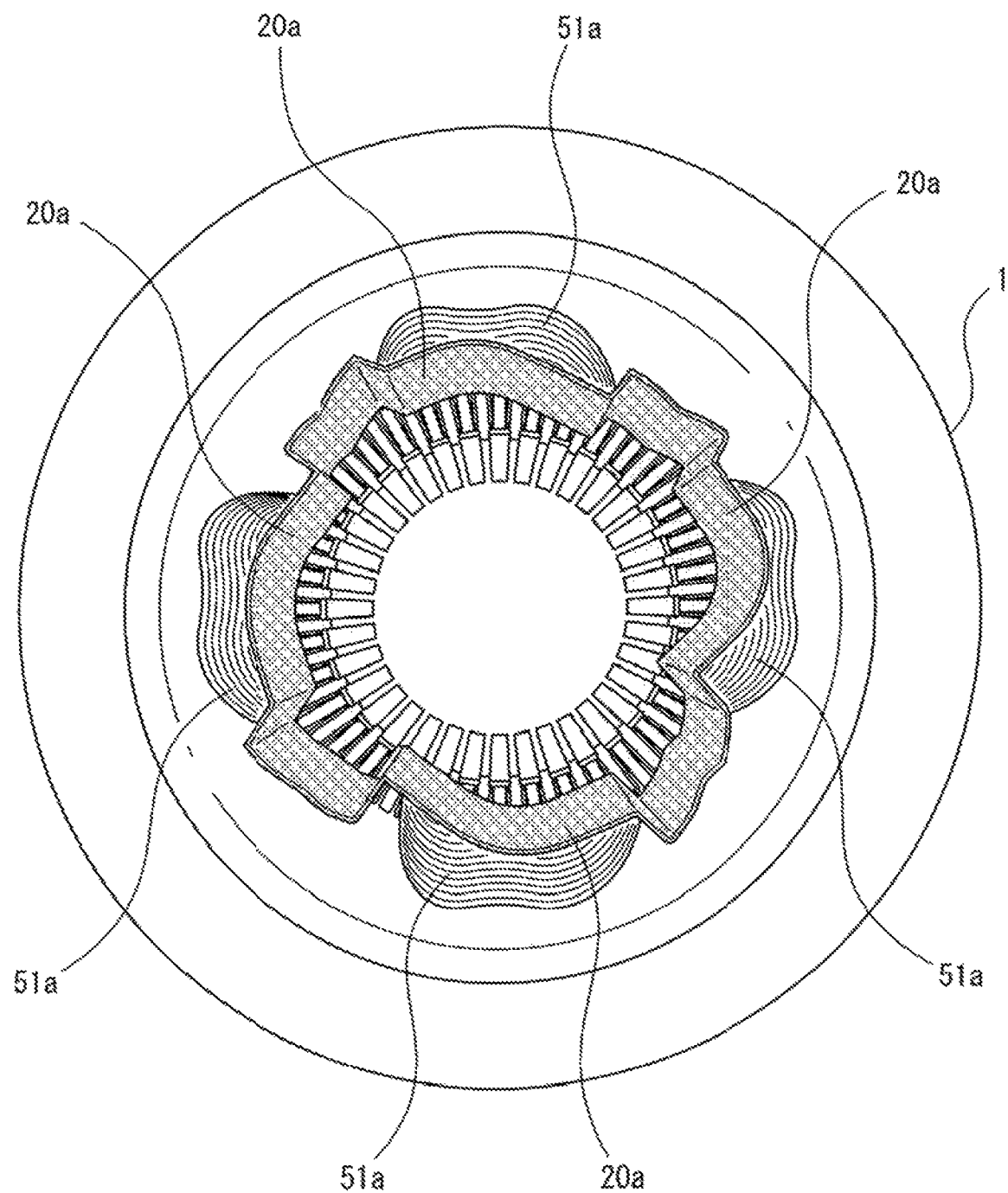
FIG. 10 is a view showing the state in which the first coil and the insulating sheet are mounted on the stator core.

FIG. 10 is a view showing a state, as viewed from above, in which four first coils 51a have been installed in the stator core 1, and four insulating sheets 20a have been installed on the inner sides of the four first coils 51a. As shown in FIG. 10, the four insulating sheets 20a are arranged at 90° intervals in the circumferential direction so that edges of adjacent sheet-like insulating parts 201 are overlapped in the circumferential direction. As a result, the inner sides of the four first coils 51a in the radial direction of the stator core 1 are fully covered by the four insulating sheets 20a. Furthermore, spaces for installation of the second coils 51b, etc., are ensured on the radially inner sides of the four insulating sheets 20a.

Figure 6:
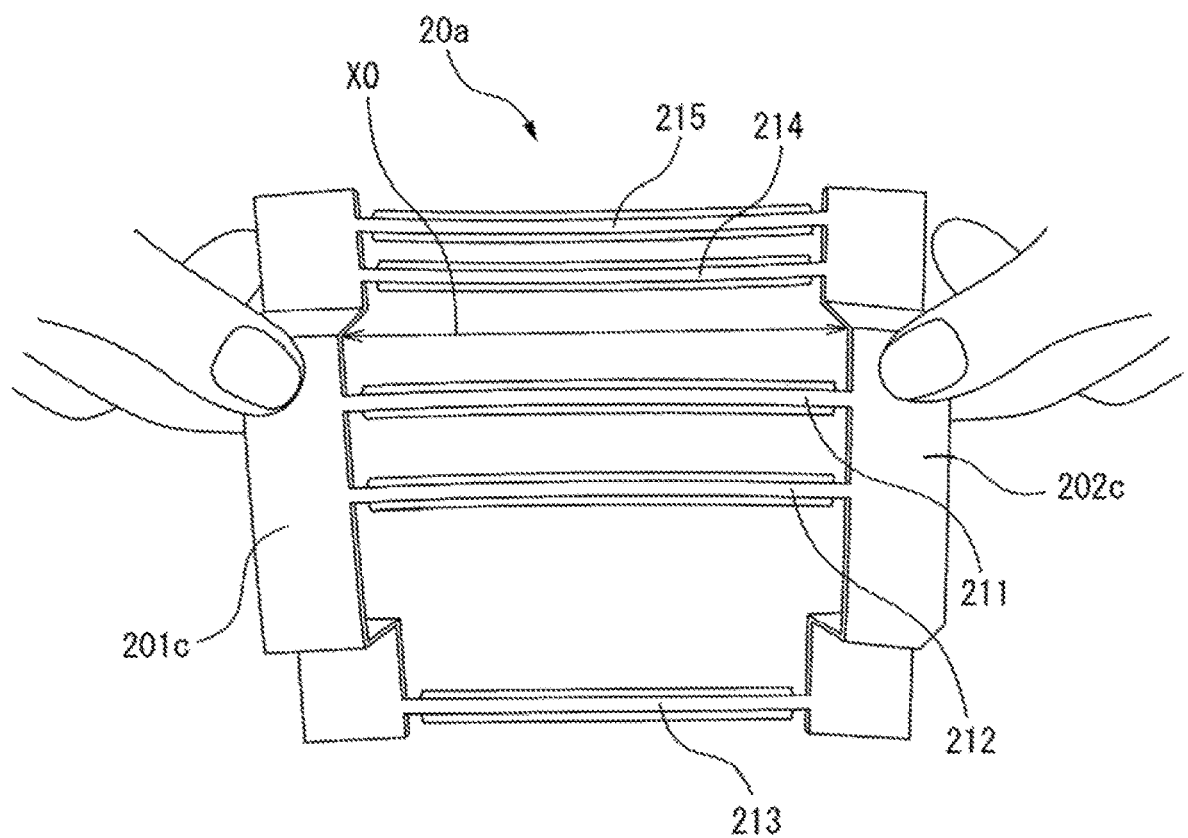
FIG. 6 is a view showing the state when a force which pulls in directions so as to separate a pair of sheet-like insulating parts are applied to the insulating sheet according to the embodiment.
Figure 7:
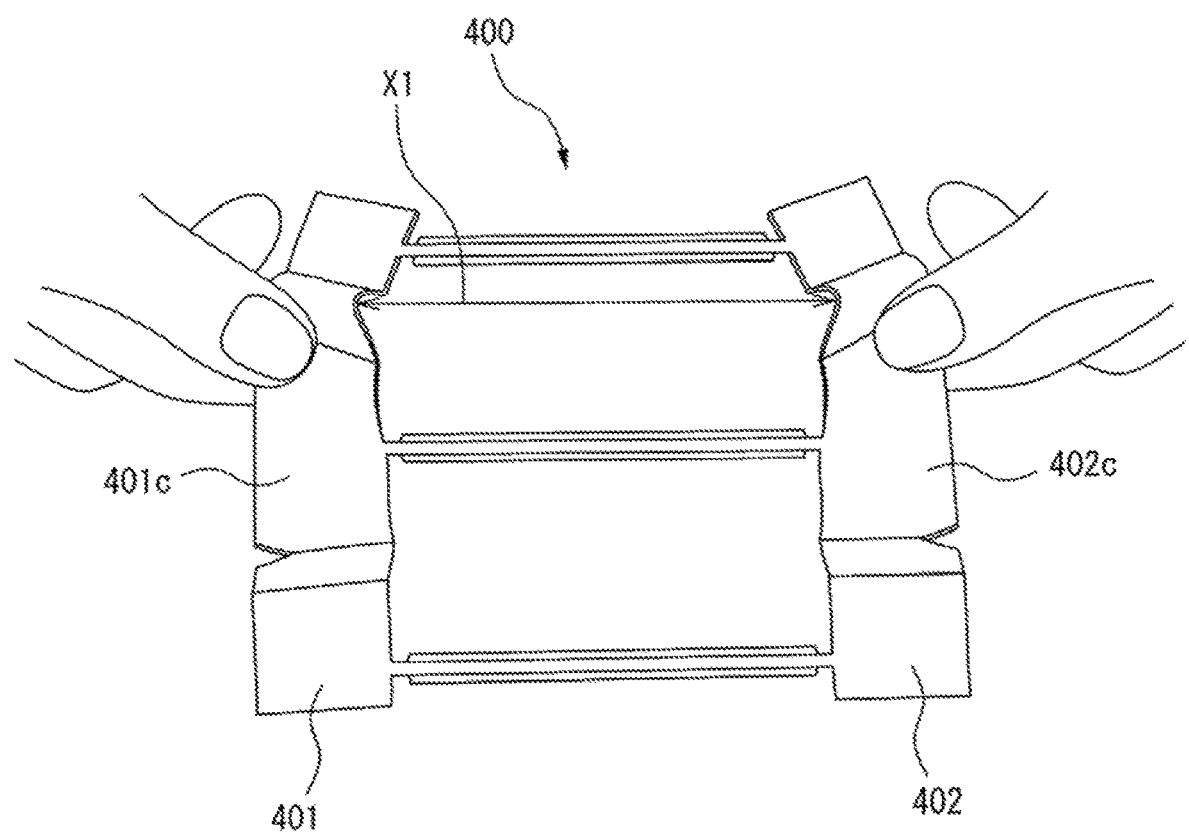
FIG. 7 is a view showing the state when a force which pulls in directions so as to separate a pair of sheet-like insulating parts are applied to an insulating sheet of a comparative example.

FIG. 6 illustrates a state in which a force is applied to the insulating sheet 20a in a direction so as to separate the main portion 201c and the main portion 202c with respect to each other. As a comparative example, FIG. 7 shows a state in which a force is applied to an insulating sheet 400, which includes only one leg part in the center of the main portion, in a direction so as to separate a main portion 401c and a main portion 402c with respect to each other. In FIGS. 6 and 7, the same levels of force are applied to the sheet-like insulating parts 201 and 202, and the sheet-like insulating parts 401 and 402 at positions where it is considered that the pulling force when the second coil 51b is inserted into the stator core 1 is strongly applied. When FIG. 6 and FIG. 7 are compared with each other, it can be understood that the distortion of the portion indicated by the double-ended arrow X0 in FIG. 6 is less than the distortion indicated by the double-ended arrow X1 in FIG. 7. Thus, at the time of insertion of the second coil 51b, the change in the interval between the sheet-like insulating parts 201, 202 of the insulating sheet 20a is less than the change in the interval between the sheet-like insulating parts 401, 402 of the insulating sheet 400 of the comparative example. As a result, regarding the insulating sheet 20a according to the present embodiment, it is possible to more reliably prevent occurrence of a situation in which a prior-inserted insulating sheet is pulled and distorted or displaced by a later-inserted winding.

Figure 8A:
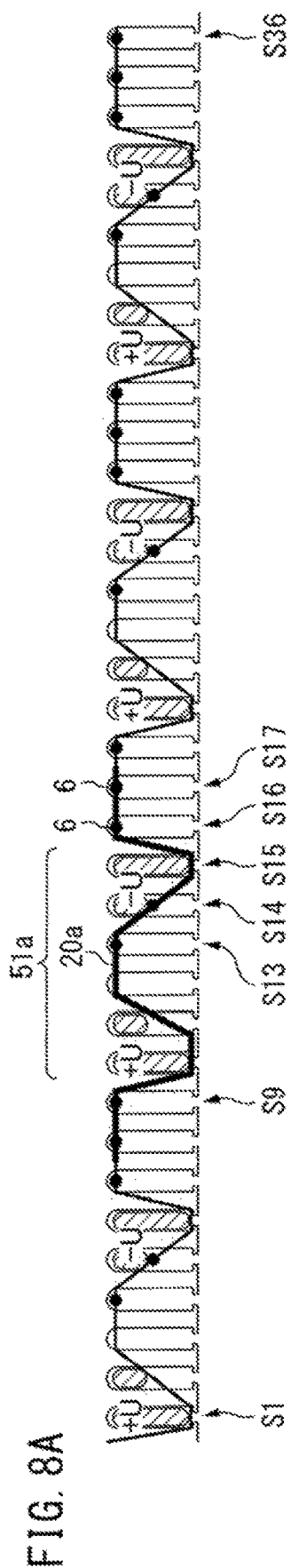
FIGS. 8A to 8C are development views of stator core slots.
Figure 8B:
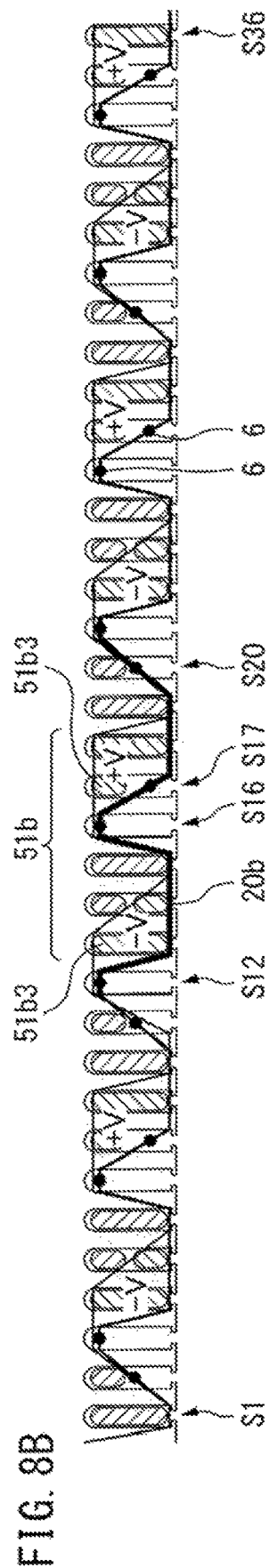
Figure 8C:
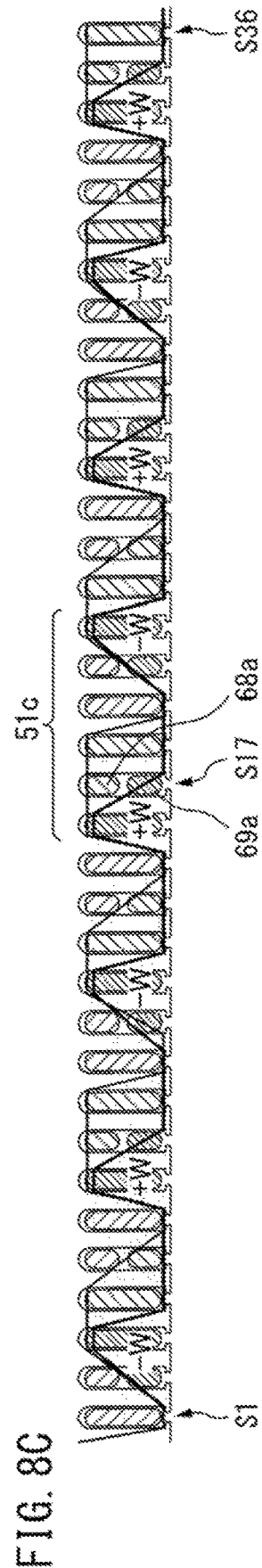

FIGS. 8A to 8C are development views in which 36 slots 31 arrayed in the circumferential direction on the inner circumferential surface of the stator core 1 are linearly developed. It should be noted that FIGS. 8A to 8C illustrate cross-sections of the 36 slots taken along a plane perpendicular to the axial direction. These development views illustrate how the coils are filled into the slots 31 and the appearance of the arrangement of the insulation sheets. Note that in FIGS. 8A to 8C, the phases of the coils are represented by the reference signs "+U", "−U", "+V", "−V", "+W", and "−W". As used herein, "+" and "−" represent the direction of current in the direction perpendicular to the sheet of FIG. 8. FIG. 8A shows a state in which the first coils 51a and the insulating sheets 20a have been arranged in the 36 slots 31. FIG. 8B shows a state in which the second coils 51b and the insulating sheets 20b have been further arranged from the state of FIG. 8A. FIG. 8C shows a state in which the third coils 51c have been further arranged from the state of FIG. 8B. Furthermore, in FIGS. 8A to 8C, the left-most slot in the drawing is designated as slot number 1, and the slot numbers are assigned so that the numbers increase from left to right in the drawing.

In FIG. 8A, among the four first coils 51a, a reference sign has been assigned to a single representative first coil 51a. Furthermore, in FIG. 8A, the four insulating sheets 20a are represented by the solid line, and a single representative insulating sheet 20a is represented by a thick solid line and assigned a reference sign. The circles 6 (only parts thereof are assigned reference signs) in FIG. 8A represent the positions of the leg parts 211 to 215 of the insulating sheet 20a. Note that in a state in which the insulating sheets 20a shown in FIG. 8 have been mounted, the leg parts of the insulating sheets 20a can be arranged in empty slots or in slots in which half of the slot is empty. Referring to FIG. 8A, the four first coils 51a having five-slot pitches are arranged in the 36 slots 31 at 90° intervals. The first coils 51a are constituted by winding a winding material having the quantity corresponding to 1.5 slots. Regarding the insulating sheet 20a which is assigned a reference sign in FIG. 8A, the leg parts 212, 211 are inserted into the thirteenth and fourteenth slots S13, S14, respectively, the leg part 213 is inserted into the ninth slot S9, and the leg parts 214, 215 are inserted into the sixteenth and seventeenth slots S16, S17, respectively.

In FIG. 8B, among the four second coils 51b, a single representative second coil 51b has been assigned a reference sign. Furthermore, in FIG. 8B, the four insulating sheets 20b are represented by solid lines, and a single representative insulating sheet 20b is represented by a thick solid line and has been assigned a reference sign. The circles 6 (only parts thereof are assigned reference signs) in FIG. 8B represent the positions of the leg parts of the insulating sheets 20b. In a state in which the insulating sheets 20a and the insulating sheets 20b have been mounted, the leg parts of the insulating sheets 20b can be arranged in an empty slot or a slot which is half empty. As shown in FIG. 8B, the second coils 51b include third portions 51b3 which are accommodated in the slots (second slots) in which the first coils 51a are not accommodated. Referring to FIG. 8B, the four second coils 51b having five-slot pitches are arranged in the 36 slots 31 at 90° intervals. The second coils 51*b* are constituted by winding a winding material having the quantity corresponding to 1.5 slots.

As shown in FIG. 8C, the third coils 51*c* are arranged so as to overlap with the second coils 51*b*. In FIG. 8C, a single representative third coil 51*c* is assigned a reference sign. The third coil 51*c* is constituted by winding a winding material having the quantity corresponding to 1.5 slots. Since each of the first through third coils 51*a* to 51*c* is constituted by winding a winding material having the quantity corresponding to 1.5 slots, by installing all of the first through third coils 51*a* to 51*c* in the slots 31, all 36 slots are filled therewith.

The second coil 51*b* includes a fourth portion (assigned reference sign 68*a* in FIG. 8C) which is accommodated in slot S17, in which both the second coil 51*b* and the third coil 51*c* are inserted. The third coil 51*c* includes a fifth portion 69*a* which is accommodated in slot S17.

Figure 9:
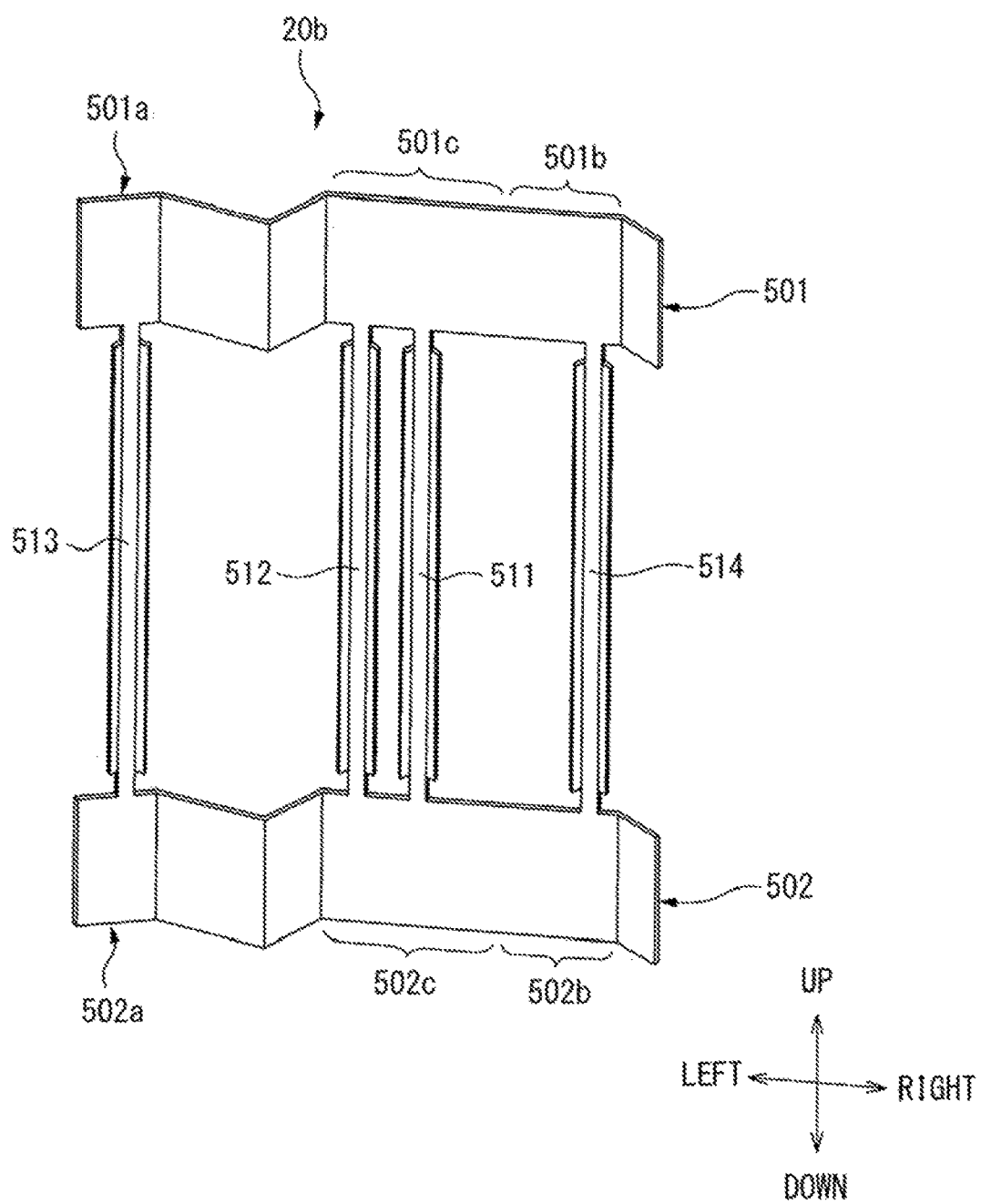
FIG. 9 is a perspective view of an insulating sheet arranged between the second coil and a third coil.

Insulating sheets 20*b* are installed between the second coils 51*b* and the third coil 51*c*. FIG. 9 is a perspective view of the insulating sheet 20*b*. For convenience of explanation, in FIG. 9, the direction corresponding to the axial direction is defined as the upward and downward directions, and the left and right directions are defined as described in FIG. 9. The insulating sheet 20*b* includes a pair of sheet-like insulating parts 501, 502 which project respectively from the pair of end surfaces 1*a*, 1*b* of the stator core 1 in the axial direction, and a plurality of leg parts 511 to 514 which connect the pair of sheet-like insulating parts 501, 502 to each other. Each of the pair of sheet-like insulating parts 501, 502 is arranged between the coil ends of the second coil 51*b* extending from the fourth portion 68*a* toward the outside of the pair of end surfaces 1*a*, 1*b* and the coil ends of the third coil 51*c* extending from the fifth portion 69*a* toward the outside of the pair of end surfaces 1*a*, 1*b*. The plurality of leg parts 511 to 514 include a first leg part 511 which is inserted into slot S17 and which is arranged between the fourth portion 68*a* and the fifth portion 69*a*.

As shown in FIG. 9, the sheet-like insulating part 501 is arranged so as to protrude from the end surface 1*a* of the stator core 1. The sheet-like insulating part 502 is arranged so as to protrude from the other end surface 1*b* of the stator core 1. The plurality of leg parts 511 to 514 extend in the axial direction of the stator core 1 so as to connect the sheet-like insulating part 501 and the sheet-like insulating part 502.

The sheet-like insulating part 501 includes a main portion 501*c* which is connected to the first leg part 511 and which is interposed between the coil end of the second coil 51*b* and the coil end of the third coil 51*c*, and sub-portions 501*a*, 501*b* which extend from the main portion 501*c*. The sub-portion 501*b* is spaced from the coil end of the second coil 51*b* and is arranged radially outside of the stator core 1 with respect to the coil end of the third coil 51*c*. The main portion 501*c* covers the radially inner side of the coil end of the second coil 51*b*, which protrudes from the end surface 1*a* of the stator core 1. Likewise, the sheet-like insulating part 502 includes a main portion 502*c* which is connected with the first leg part 511 and which is interposed between the coil end of the second coil 51*b* and the coil end of the third coil 51*c*, and sub-portions 502*a*, 502*b* which extend from the main portion 502*c*. The sub-portion 502*b* is spaced from the coil end of the second coil 51*b* and is arranged radially inside of the stator core 1 with respect to the third coil 51*c*. The main portion 502*c* covers the radially inner side of the coil end of the second coil 51*b*, which protrudes from the end surface 1*b* of the stator core 1.

The main portion 501*c* and the main portion 502*c* are connected by the two leg parts 511, 512. The two leg parts 511, 512, as shown in FIG. 8, are arranged, on the main portions 501*c*, 502*c*, in a range in which the second coil 51*b* and third coil 51*c* overlap with each other. Specifically, the second leg part 512 is accommodated in slot S16, in which the first coil 51*a* and the second coil 51*b* are not accommodated. The first leg part 511 is accommodated in slot S17, in which the second coil 51*b* and the third coil 51*c* are accommodated. By providing the main portion 501*c* (502*c*) of the insulating sheet 20*b* with a plurality of leg parts, when the third coil 51*c* is inserted into and installed in the slot 31 from above from a state in which the first coil 51*a*, the insulating sheet 20*a*, the second coil 51*b*, and the insulating sheet 20*b* are installed, particularly the lower sheet-like insulating part 502 of the insulating sheet 20*b* can be prevented from being dragged by the third coil 51*c* and thereby distorted, displaced or entangled. In the present embodiment, since the first leg part 511 is arranged in positions of the sheet-like insulating parts 501, 502 corresponding to the slot S17 where the pulling force is likely to be strong when the third coil 51*c* is inserted from the upper side, it is possible to more reliably prevent the insulating sheet 20*b* from being distorted, displaced or entangled. Furthermore, arrangement of the first leg part 511 in the slot S17 in which both the second coil 51*b* and the third coil 51*c* are inserted contributes to an increase in the insulation between the second coil 51*b* and the third coil 51*c*. Like the leg parts 211 to 215 of the insulating sheet 20*a*, each of the leg parts 511 to 514 of the insulating sheet 20*b* has a downwardly open trapezoidal cross-sectional shape along the axial direction.

The center two leg parts 511, 512 of the four leg parts 511 to 514 of the insulating sheet 20*b* are inserted into the two slots 31, lying in the range in which the second coil 51*b* and the third coil 51*c* overlap, in a six-slot range of the second coil 51*b* in the circumferential direction. In detail, the leg parts 511, 512 are installed in the sixteenth and seventeenth slots S16, S17, in which the third coils 51*c* are inserted, in a six-slot range of the second coil 51*b*. The leg part 513 is inserted into the twelfth slot S12, which is outside (the left side in FIG. 8B) the second coil 51*b* in the circumferential direction. The leg part 514 is inserted into the twentieth slot S20, which is outside (the right side in FIG. 8) of the second coil 51*b* in the circumferential direction.

Figure 11:
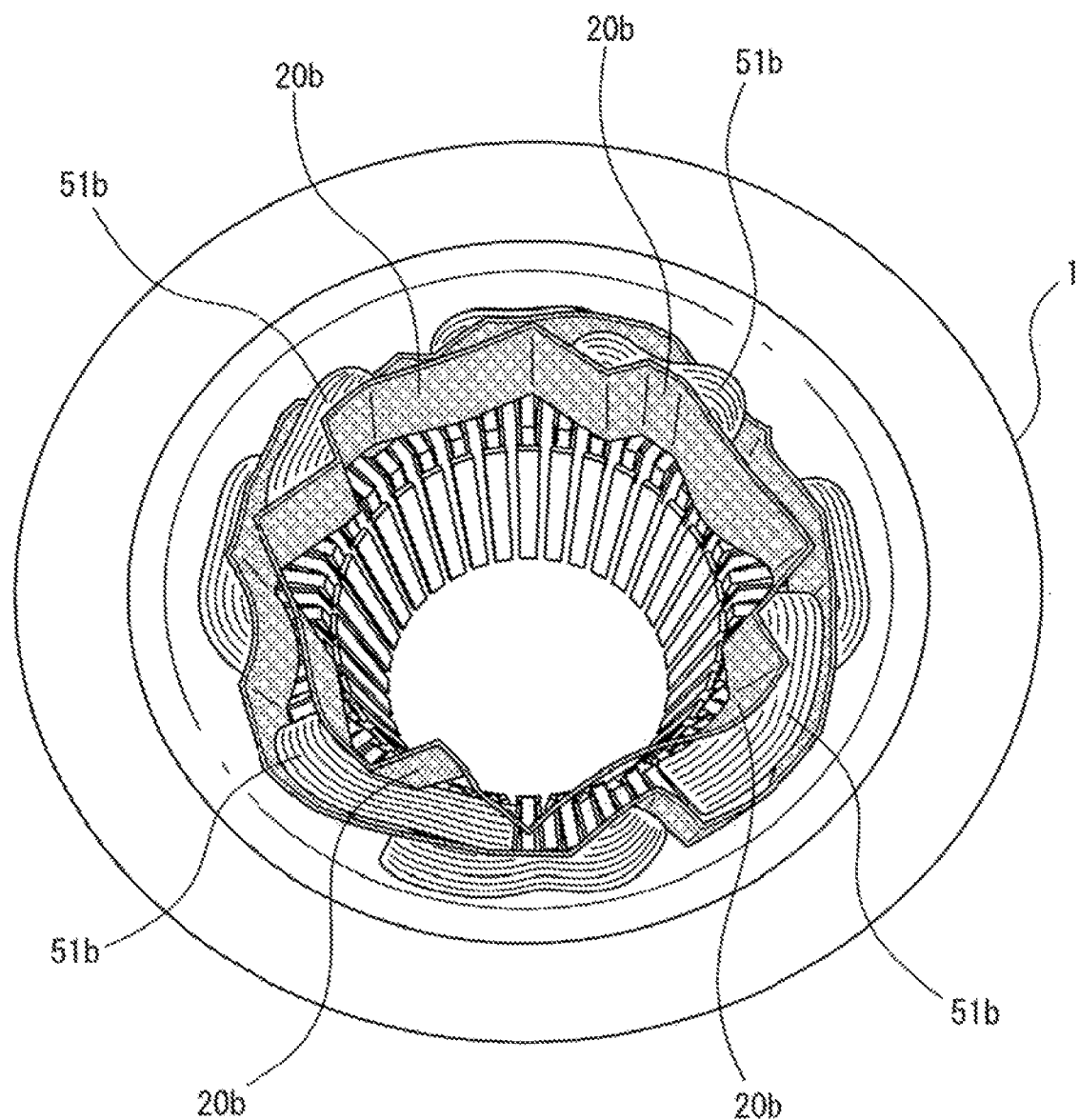
FIG. 11 is a view showing the state in which the first coil, the second coil, and the insulating sheet are mounted on the stator core.

FIG. 11 shows a state in which the four second coils 51*b* have further been installed in the stator core 1 from the state of FIG. 10, and the four insulating sheets 20*b* have been installed in the inside of the four second coils 51*b*. In the case of the insulating sheet 20*b* as well, since the two leg parts 511, 512 are formed in a range in which the second coil 51*b* and the third coil 51*c* overlap, the insulating sheet 20*b* can be prevented from being distorted, displaced, or entangled when the third coil 51*c* is inserted into the slot 31. As shown in FIG. 11, the four insulating sheets 20*b* are arranged at 90° intervals in the circumferential direction, and the circumferential ends of the adjacent sheet-like insulating parts 501 are arranged so as to be overlapped with each other. As a result, inner sides of the four second coils 51*b* in the radial direction of the stator core 1 are completely covered by the four insulating sheets 20*b*. Furthermore, the radially inner sides of the four insulating sheets 20*b* ensure spaces for the installation of the third coils 51*c*.

As described above, according to the present embodiment, it is possible to prevent occurrence of a situation in which a prior-inserted insulating sheet is displaced by a later-inserted winding.

Though the embodiments of the present disclosure have been described above, a person skilled in the art would understand that various modifications and changes can be made without deviating from the scope disclosed in the claims, which are described later.

Figure 12:
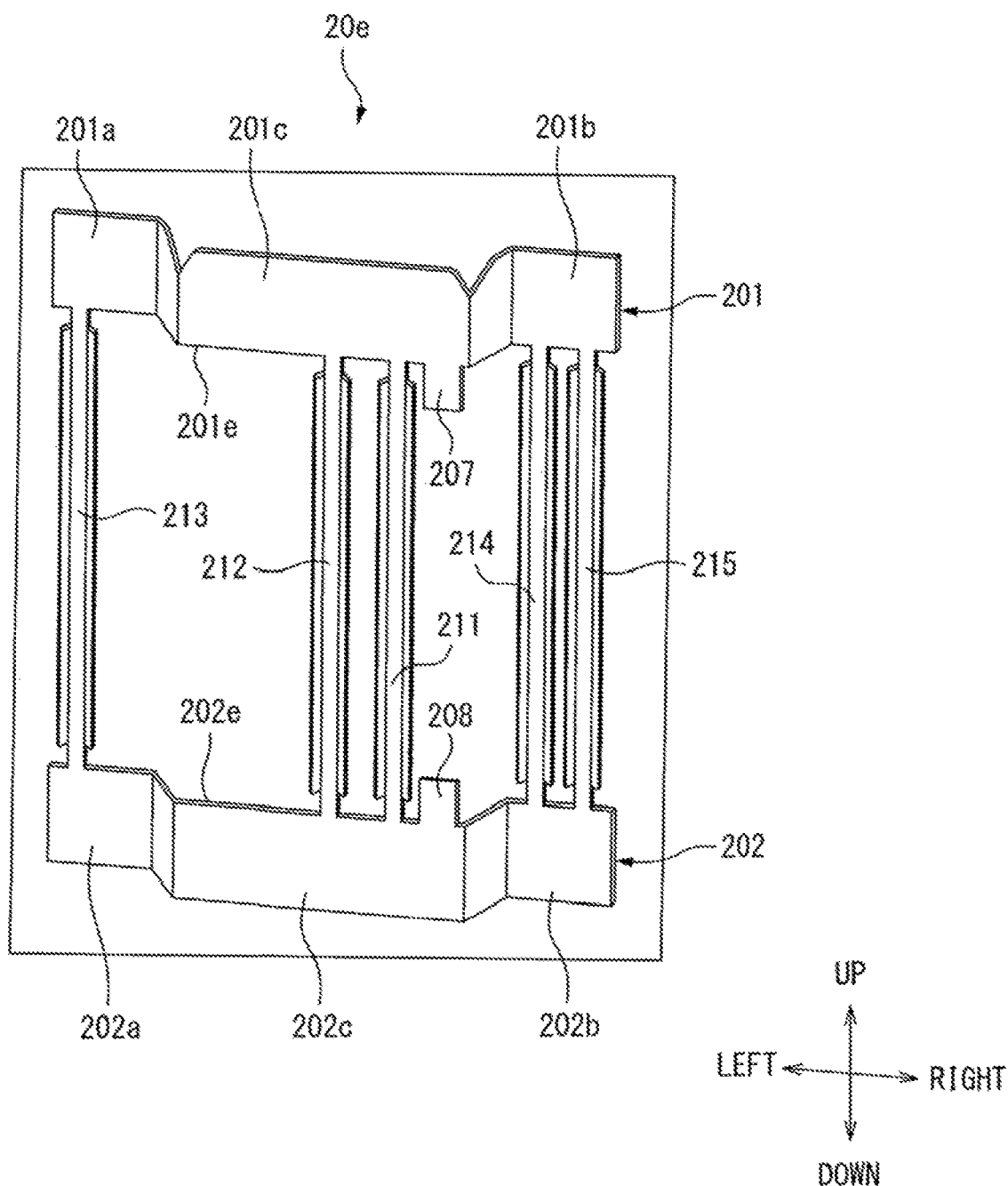
FIG. 12 is a perspective view showing a modified example of an insulating sheet.

The structure of the insulating sheet 20a shown in FIG. 3 is an example, and various modifications of the insulating sheet 20a can be made. FIG. 12 is a perspective view of an insulating sheet 20e, as a modified example of the insulating sheet 20a, in which protrusions 207, 208 are added to the insulating sheet 20a. Other than the addition of the protrusions 207, 208, the insulating sheet 20e has the same structure as the insulating sheet 20a shown in FIG. 3. The insulating sheet 20e includes the protrusions 207, 208 which protrude respectively from the pair of sheet-like insulating parts 201, 202 in the same direction as the leg parts 211, 212, the protrusions 207, 208 covering the root parts of the coil ends of the second coil 51b outside the pair of end surfaces 1a, 1b. In detail, the protrusion 207 is formed at a position, on the side 201e of the main portion 201c adjacent to the stator core 1, where no leg part is formed within a range where the first coil 51a and the second coil 51b overlap. The protrusion 208 is formed at a position, on the side 202e of the main portion 202c adjacent to the stator core 1, opposite to the protrusion 207. As an example, the protrusions 207, 208 may be formed at positions corresponding to a slot (the fifteenth slot S15 in FIG. 8A) in which the first coil 51a is inserted. The protrusions 207, 208 may be formed so as to have flat shapes having a single-slot width.

Figure 13:
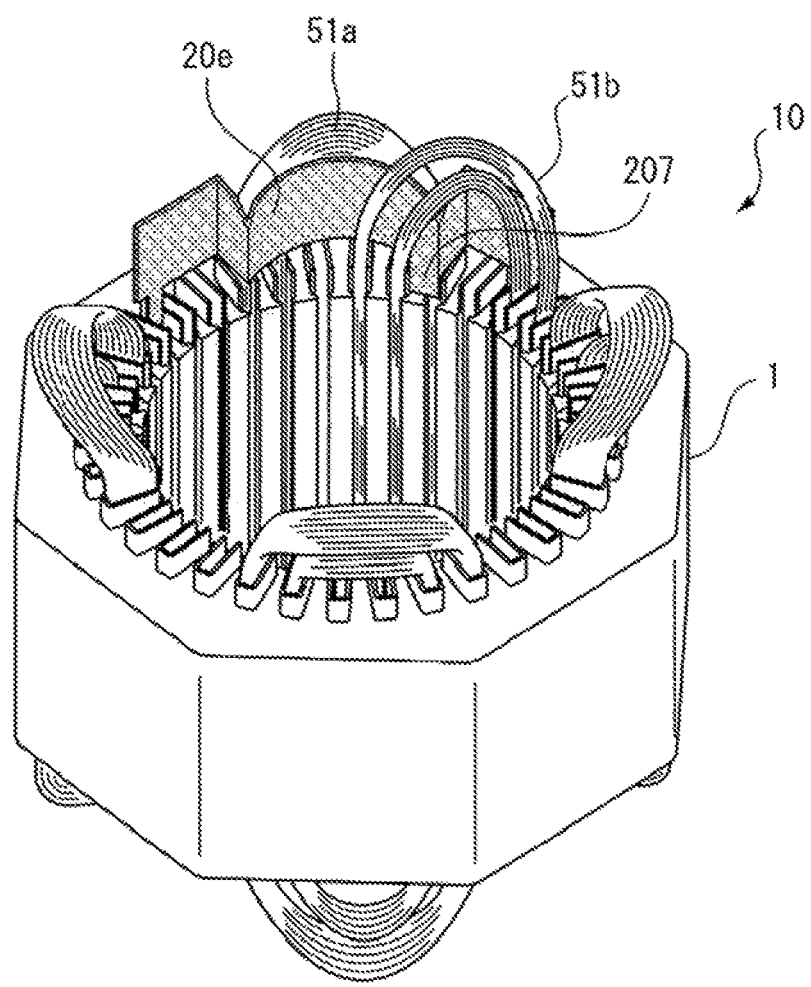
FIG. 13 is a view showing the state in which the insulating sheet of FIG. 12 is inserted between the first coil and the second coil.

FIG. 13 shows a state in which the insulating sheet 20e is inserted between the first coil 51a and the second coil 51b. The protrusions 207, 208 are arranged at positions where the root parts of the coil ends of the first coils 51a, which are first inserted into the slots 31, and the root parts of the coil ends of the second coils 51b, which are later inserted into the slots 31, overlap. As a result of this configuration, the protrusions 207, 208 are interposed between the root parts of the coil ends of the first coils 51a and the root parts of the coil ends of the second coils 51b, thereby more reliably ensuring insulation therebetween.

Figure 14:
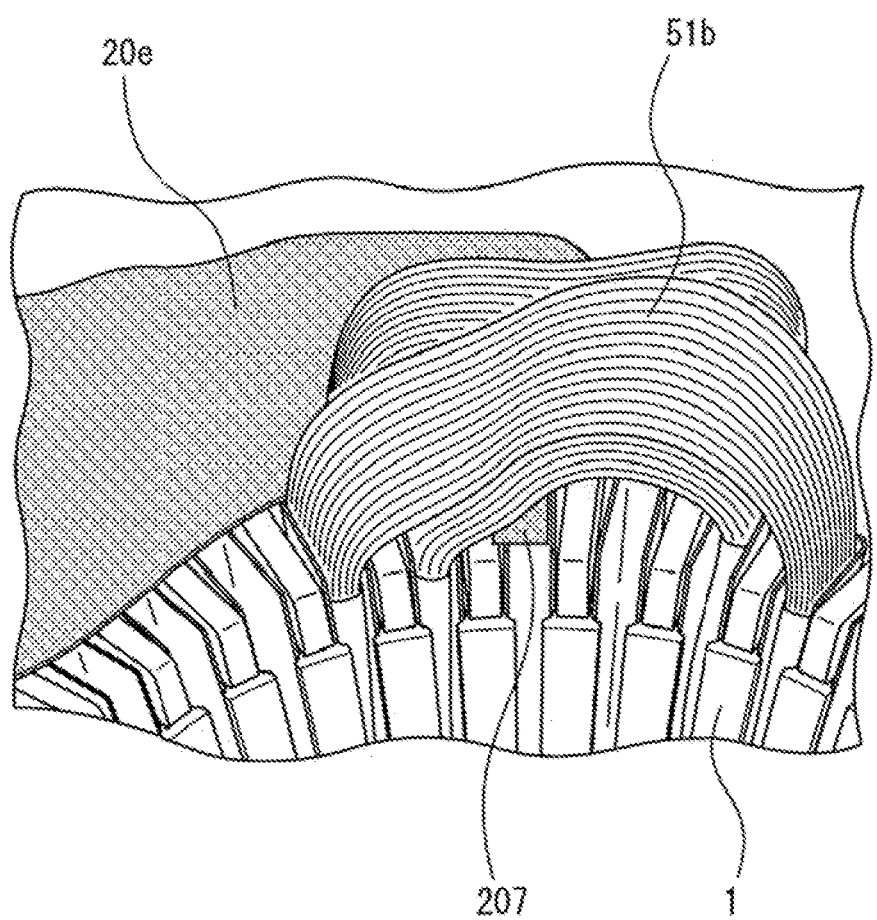
FIG. 14 is an enlarged view of the vicinity of a protrusion in a state in which the insulating sheet of FIG. 12 is installed between the first coil and the second coil.

FIG. 14 is an enlarged view of the vicinity of the protrusion 207 in a state in which the insulating sheet 20e has been installed between the first coil 51a and the second coil 51b. From FIG. 14, it can be understood that the protrusion 207 is interposed between the root part of the coil end of the first coil 51a and the root part of the coil end of the second coil 51b.

Though the insulating sheet according to the embodiments has been described above as being used between coils of different phases in a three-phase alternating current electric motor, the insulating sheet according to the embodiments described above can be used for insulation between the coils of various types of electric motors in which a plurality of coils are overlapped in slots of a stator core by distributed wiring.

The invention claimed is:

1. A stator, comprising:
a stator core having a plurality of slots;
a first coil and a second coil inserted into the plurality of slots by distributed winding; and
an insulating sheet arranged between the first coil and the second coil, wherein
the first coil has a first portion accommodated in a first slot,
the second coil has a second portion accommodated in the first slot,
the insulating sheet includes a pair of sheet-like insulating parts which project from a pair of respective end surfaces of the stator core in an axial direction of the stator core, and a plurality of leg parts which connect the pair of sheet-like insulating parts to each other,
each of the pair of sheet-like insulating parts is arranged between a first coil end of the first coil extending from the first portion to an outside of each of the pair of end surfaces and a second coil end of the second coil extending from the second portion to the outside of each of the pair of end surfaces, and
the plurality of leg parts include a first leg part which is inserted into the first slot and which is arranged between the first portion and the second portion, wherein each of the pair of sheet-like insulating parts includes:
a main portion which is connected to the first leg part and which is interposed between the first coil end and the second coil end; and
a sub-portion extending from the main portion, the sub-portion being spaced from the first coil end and being arranged radially outward from the first leg part with respect to the second coil end.

2. The stator according to claim 1, wherein the second coil includes a third portion which is accommodated in a second slot, the second slot not accommodating the first coil, and
the plurality of leg parts include a second leg part which is arranged between the third portion and an inner surface of the second slot.

3. The stator according to claim 2, wherein the plurality of leg parts include one leg part formed as the second leg part to be connected to the main portion, and another leg part formed as the second leg part to be connected to the sub-portion.

4. The stator according to claim 1, wherein each of the plurality of leg parts has a shape which maintains a position thereof by means of an elastic restorative force in a deformed state in contact with an inner surface of the slot.

5. An electric motor comprising the stator according to claim 1.

6. A stator, comprising:
a stator core having a plurality of slots;
a first coil and a second coil inserted into the plurality of slots by distributed winding; and
an insulating sheet arranged between the first coil and the second coil, wherein
the first coil has a first portion accommodated in a first slot,
the second coil has a second portion accommodated in the first slot,
the insulating sheet includes a pair of sheet-like insulating parts which project from a pair of respective end surfaces of the stator core in an axial direction of the stator core, and a plurality of leg parts which connect the pair of sheet-like insulating parts to each other,
each of the pair of sheet-like insulating parts is arranged between a first coil end of the first coil extending from the first portion to an outside of each of the pair of end surfaces and a second coil end of the second coil extending from the second portion to the outside of each of the pair of end surfaces, and
the plurality of leg parts include a first leg part which is inserted into the first slot and which is arranged between the first portion and the second portion, wherein the insulating sheet includes protrusions which protrude from the pair of sheet-like insulating parts in the same direction as the first leg part, each of the protrusions covering a root part of the first coil end connected to the first portion on the outside of each of the end surfaces.

7. The stator according to claim 6, wherein each of the plurality of leg parts has a shape which maintains a position thereof by means of an elastic restorative force in a deformed state in contact with an inner surface of the slot.

8. An electric motor comprising the stator according to claim 6.

* * * * *